United States Patent [19]
Reyling, Jr. et al.

[11] 3,949,370
[45] Apr. 6, 1976

[54] PROGRAMMABLE LOGIC ARRAY CONTROL SECTION FOR DATA PROCESSING SYSTEM

[75] Inventors: George F. Reyling, Jr., Sunnyvale; William H. Beall, Palo Alto, both of Calif.

[73] Assignee: National Semiconductor Corporation, Santa Clara, Calif.

[22] Filed: June 6, 1974

[21] Appl. No.: 477,053

[52] U.S. Cl. ............................................ 340/172.5
[51] Int. Cl.² .......................................... G06F 9/00
[58] Field of Search ........... 340/172.5; 444/1; 445/1

[56] References Cited
UNITED STATES PATENTS

| | | | |
|---|---|---|---|
| 3,579,192 | 5/1971 | Rasche | 340/172.5 |
| 3,736,567 | 5/1973 | Lotan et al. | 340/172.5 |
| 3,745,533 | 7/1973 | Erwin et al. | 340/172.5 |
| 3,748,649 | 7/1973 | McEowen et al. | 340/172.5 |
| 3,766,532 | 10/1973 | Liebel | 340/172.5 |
| 3,827,030 | 7/1974 | Seipp | 340/172.5 |
| 3,849,765 | 11/1974 | Hamano | 340/172.5 |
| 3,872,447 | 3/1975 | Tessera et al. | 340/172.5 |

*Primary Examiner*—Mark E. Nusbaum
*Attorney, Agent, or Firm*—Lowhurst & Aine

[57] ABSTRACT

A data processing system includes an external store for storing macroinstructions, a microprogrammed control section, and a processing section. The control section includes a control unit having an instruction register for receiving the operation codes of selected macroinstructions from the external store, and a control store for storing microinstructions. The processing section includes a register unit for storing data information to be processed and an arithmetic and logic unit connected to the register unit for performing operations on the data information contained therein. A programmed means is employed for generating address information in accordance with the operation codes of selected macroinstructions and supplying such address information to the control store. One or both of either the programmed means or the control store are implemented with programmable logic arrays.

7 Claims, 7 Drawing Figures

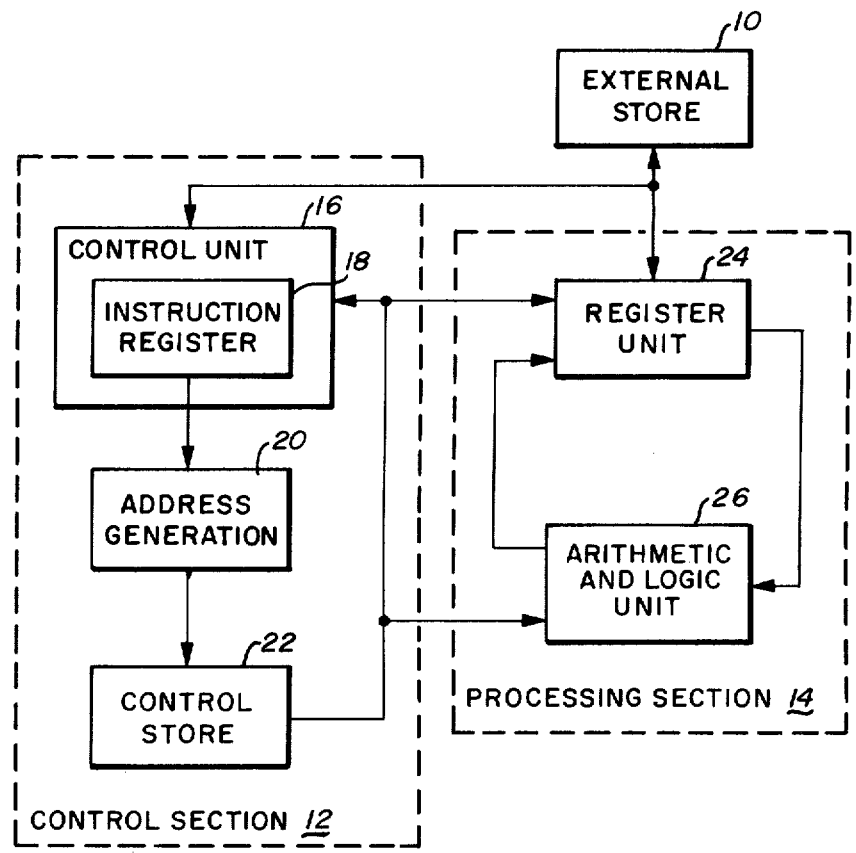
Fig_1

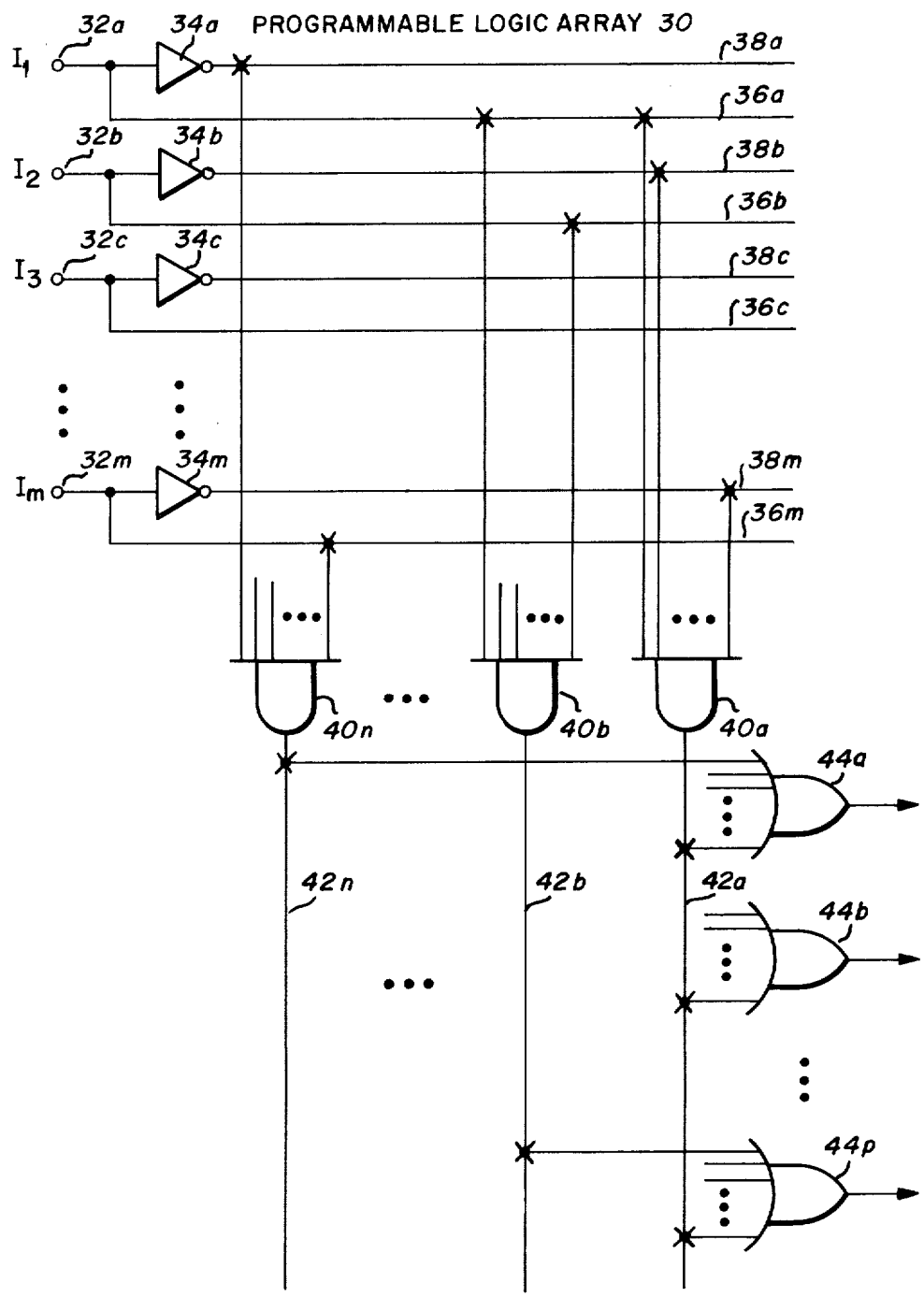
Fig_3

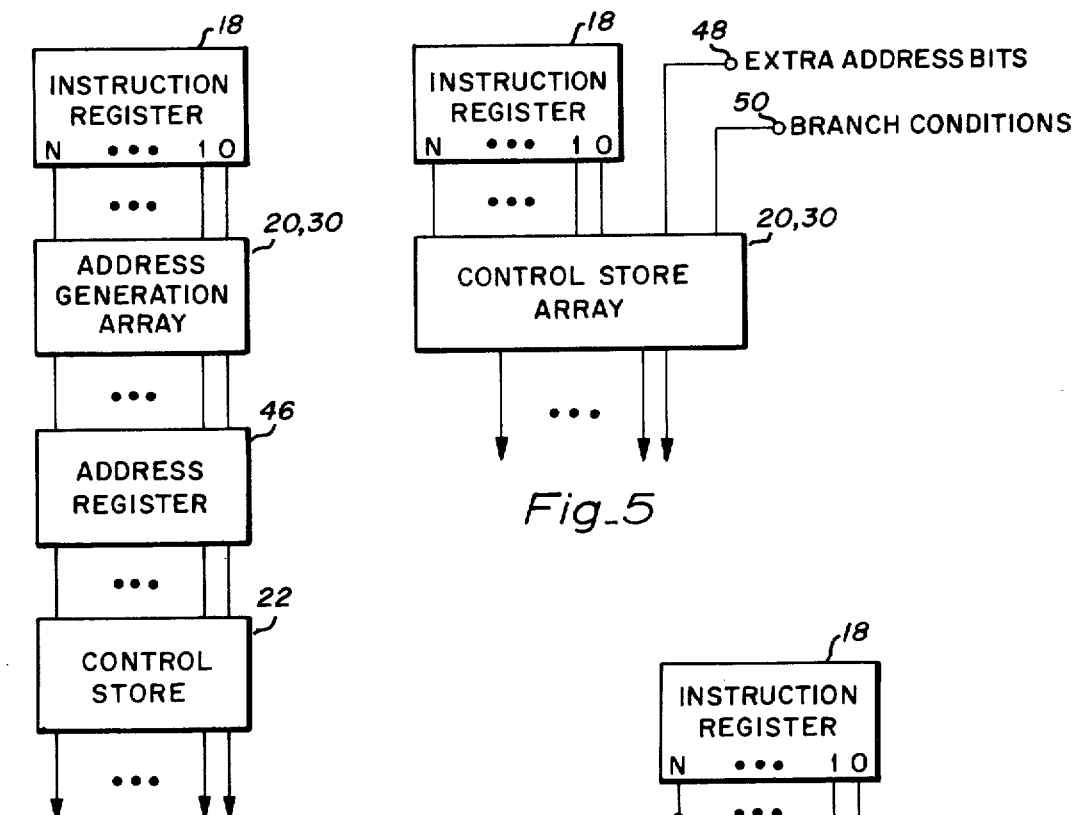
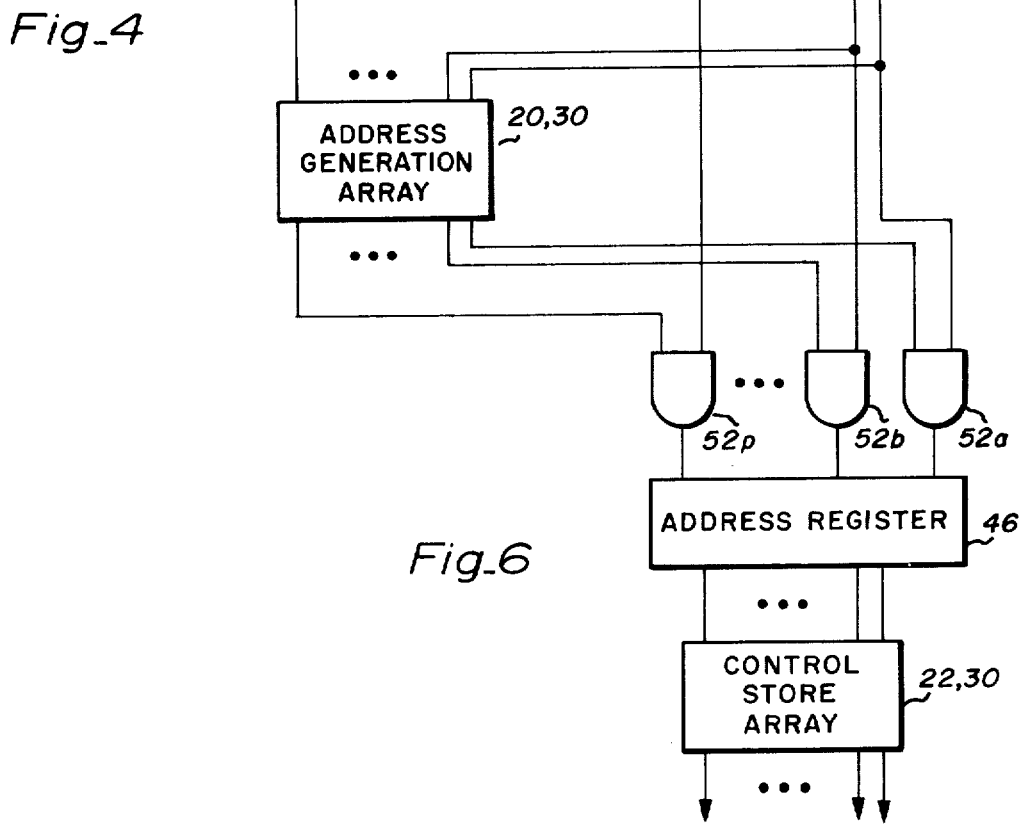

PROGRAMMABLE LOGIC ARRAY CONTROL SECTION FOR DATA PROCESSING SYSTEM

BACKGROUND OF THE INVENTION

1. Field of the Invention

This invention relates generally to a data processing system, and more particularly to a microprogrammed control unit which is implemented with programmable logic arrays.

2. Prior Art

In a microprogrammed processor computer there are two levels of programming; namely, the microinstruction level and the macroinstruction level. The macroinstruction level is contained in a sequence or set of instructions known collectively as a program which is prepared by a programmer or operator of the computer to solve particular problems. The macroinstruction level program for the computer includes a set of machine operations, such as addition, multiplication, and the like, which can be selected at the programmer's disposal. Within the computer, these machine operations are capable of selecting a set of microroutines which include microinstructions corresponding to such operations as shifting, counting, word transfer and the like, which instructions are selectible by the machine designer.

A portion of each instruction in the macroinstruction level is a binary number called the operation code, and this code is supplied to a control unit within the machine to select one of a number of possible execution sequences. In a microprogram computer, the operation code of a machine instruction is employed as an address into a control store. The microprogram having an entry point at that address is executed to achieve the desired control function. Microinstructions stored in the control store cause the control unit within the machine to carry out the basic control functions of the processor and cause the arithmetic and logic unit (ALU) to carry out the basic data processing functions of the processor on data which is stored in a register unit.

The two basic functions of the microprogrammed control store in conjunction with the control unit are called the "fetch" function and the "execute" function. In performing the fetch function, the control section, which includes the control unit and control store, executes a series of microinstructions which cause a macroinstruction to be read (or fetched) from the external store containing such macroinstructions into an instruction register within the control unit.

For each macroinstruction which has been fetched or supplied into the instruction register, there is a particular series of microinstructions (microroutine) in the microprogram control store which must be executed to carry out the execute function corresponding to that macroinstruction. For example, if the macroinstruction included a "register add" instruction, the microroutine would access data from the appropriate registers in the register unit and cause the arithmetic and logic unit to add the selected data, and would then store the resultant total in an appropriate register within the register unit. After completing the execute function, the control section would then return to the fetch function mode to read or fetch another macroinstruction.

In order to access the correct microroutine in the control store, the operation code portion of the contents of the instruction register must be employed to specify the initial microinstruction address for the microroutine. This requirement may present a considerable problem in that the operation code portion of the various instructions for a particular processor is of varying of different length. In the case of simple processors, the length of some of the operation code portions or fields may exceed the number of bits which are permitted for addressing the control store containing the microinstructions. As one example, the instruction format for a 16 bit macroinstruction set may contain an operation code field which varies from four to 10 bits in length. In the event the control store has less than several hundred words of storage, the operation code may not be employed directly to specify the address of the appropriate microroutine, since the address would in certain instances exceed the storage bounds of the control store. In the event the control store contains more than 1024 words of storage, corresponding to 10 address bits, it is desirable to allow the microprogrammer the choice of starting addresses, rather than having such starting addresses specified directly by the operation code, in which event such addresses may occur at awkward places in the microprogram. Accordingly, it is desirable to have a unit which transforms or maps an arbitrary operation code into an arbitrary control store address. It has been the practice in the past to employ discrete logic gates to perform this function. However, in an effort to minimize the number of gates employed, the choice of operation codes and starting addresses has been limited.

Control stores have been implemented in the past with read-only memories (ROM). A read-only memory as a control store requires exhaustive coding of all of its address input lines. Accordingly, in a processor with macroinstructions having 10 bits of instruction as operation code information, the number of address lines must be at least equal to 10. Accordingly, a control store implemented with a read-only memory would require at least 1,024 locations.

The requirement for such a large read-only memory array can sometimes be obviated by employing a two-stage control memory, with one state performing partial decoding and the other performing the actual control. However, this technique is not general and because of the relatively slow access of two levels of MOS read-only memories, system throughput may be compromised to an unacceptible level. Furthermore, in a read-only memory implementation if several instructions share parts of common code segments in the microprogram, either those segments must be repeated or a microprogram jump to a common segment (or subroutine) must be provided. Because such jumps require the insertion in the microprogram of a specific microinstruction to perform that function, which instructions must be stored in the read-only memory and require an additional cycle to execute, they degrade the system throughput.

It has also been the practice in the past to employ the technique of multiplexing the required codes into the read-only memory elements when not all code combinations of instruction data and timing data are employed. This technique effectively compresses the data to reduce the number of read-only memory words necessary to store the output data. Although the use of multiplexers significantly reduces the number of read-only memory storage required, it adds to the delay time to achieve the proper output levels. Furthermore, this technique is relatively difficult to implement, is not easily changed, and is not general.

SUMMARY OF THE INVENTION

Accordingly, it is an object of the present invention to provide a programmable logic array implemented microprogrammed control section in a digital data processing system.

Another object of the present invention is to provide a programmable logic array implemented control store in the microprogrammed control section of a digital data processing system.

Still another object of the present invention is to provide a programmable logic array implemented control storage addressing unit in a digital data processing system.

A further object of the present invention is to provide a programmable logic array implemented addressing and storage means.

Another object of the present invention is to provide a programmable logic array implemented addressing and storage means for all programmable control levels and for all parallel control sections on a given level within a data processing system.

Still a further object of the present invention is to provide a control section in a data processing system which is readily programmable with mask options.

The invention has the distinct advantage of permitting programmable addressing and data outputs with a minimum number of components. In certain circumstances the present invention can provide functional or organization advantages which result in higher speeds.

Furthermore, the microprogrammer is permitted considerably more freedom in the architectural design and such design is, therefore, considerably easier.

These and other objects, features and advantages of the present invention will be more fully realized and understood from the following detailed description, when taken in conjunction with the accompanying drawings, wherein:

BRIEF DESCRIPTION OF THE DRAWINGS

FIG. 1 is a partial block diagram a partial functional diagram of a data processing system which includes a control section constructed in accordance with the principles of the present invention.

FIG. 3 is a functional logic diagram of a programmable logic array employed in the present invention.

FIG. 4 is a block diagram of one embodiment of the present invention.

FIG. 5 is a block diagram of a second embodiment of the present invention.

FIG. 6 is a block diagram of a third embodiment of the present invention.

Like reference numerals throughout the various view of the drawings are intended to designate the same or similar elements.

DETAILED DESCRIPTION OF THE PREFERRED EMBODIMENTS

Figure 2A:
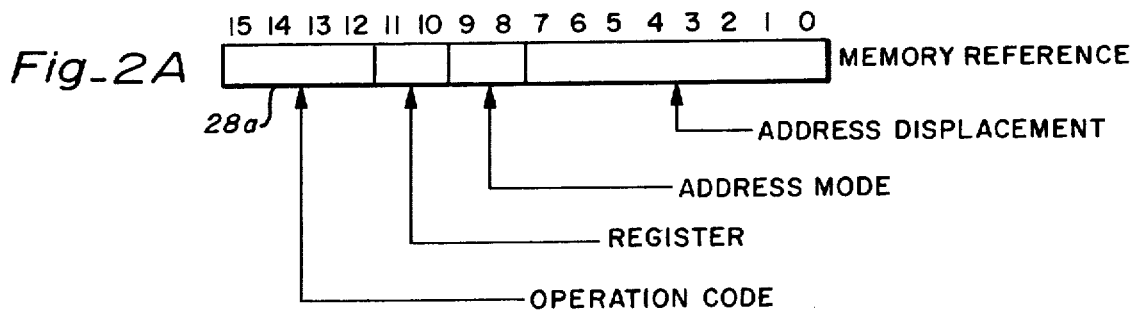
FIGS. 2A–2D are representations of a number of instruction formats which may be employed in a particular processor and which can be handled more efficiently by the present invention.
Figure 2B:
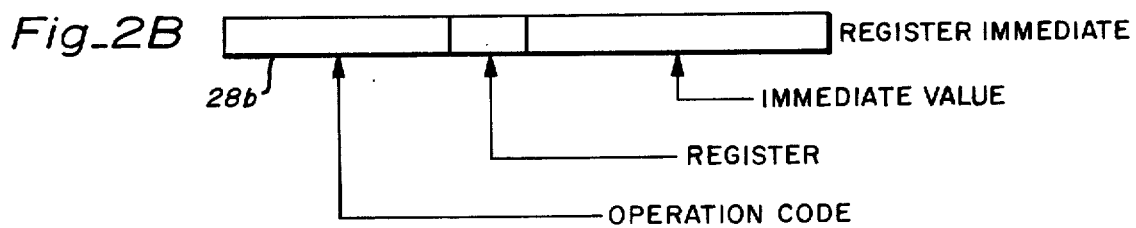
Figure 2C:
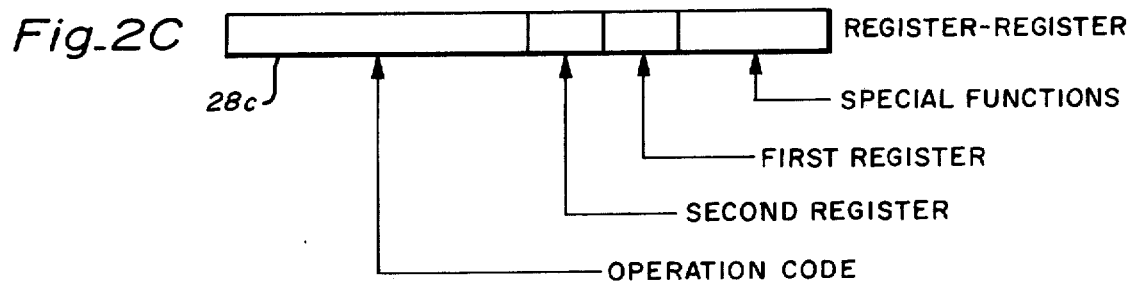
Figure 2D:
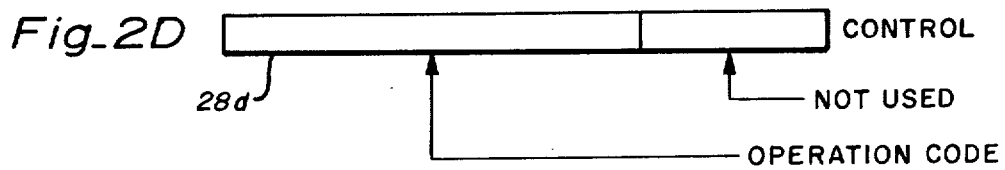

With reference to FIG. 1, there is shown a data processing system which includes an external store 10, a control section 12, and a processing section 14. The external store 10 contains the macroinstructions, each of which specifies a particular series of microinstructions (a microroutine) which must be performed to carry out the execute function associated with that macroinstruction. The control section 12 includes a control unit 16 which contains an instruction register 18 disposed for receiving and holding macroinstructions therein. An output of the instruction register 18 is supplied to address generation means 20 which transforms or maps the operation code of the macroinstruction into an appropriate address. This address is supplied to a control store 22 which contains the microinstructions.

The processing section 14 includes a register unit 24 having a plurality of registers therein for storing data information to be processed. Section 14 also includes an arithmetic and logic unit (ALU) 26 which performs such processing. Microinstructions in the control store 22 cause the control unit 16 to carry out the basic control functions of the processor and cause the ALU 26 to carry out the basic data processing functions of the processor on data stored in the register unit 24. The two basic functions of the microprogrammed control store 22 in conjunction with the control unit 16 may be considered as the "fetch" function and the "execute" function. To carry out the fetch function the control section 12 executes a series of microinstructions which cause a macroinstruction to be read or fetched from the external store 10 into the instruction register 18.

For each macroinstruction read into the instruction register 18, there is a particular series of microinstructions in the control store 22 which must be executed to carry out the execute function. For example, if the macroinstruction is a register add instruction, the microroutine would access data from the appropriate registers in the register unit 24 and would cause the ALU 26 to add the selected data. Thereafter, the same microroutine would store the results of such addition in an appropriate register in the register unit 24. After completing the execute function, the control section 12 would then return to the fetch function to fetch another macroinstruction.

For a complete discussion of data processing systems, reference is made to DIGITAL COMPUTER TECHNOLOGY AND DESIGN by Willis H. Ware, John Wiley and Sons, Inc., 1963. Control sections, such as the control unit 16, are discussed in detail in chapter 13, and ALU's, such as the ALU 26, are discussed in detail in chapter 11 thereof. It will be noted in chapter 13 that the control section of a data processing system can be either synchronous or asynchronous.

As previously mentioned, the operation code portion of the contents of the instruction register 18 must be employed to specify the initial microinstruction address for the microroutine. The operation code portion of the various instructions for a particular processor is of varying or different length, and in the case of simple processors, the length of some of the operation code fields may exceed the number of bits allowed for addressing the control store 22. A typical 16-bit macroinstruction set is shown in FIG. 2A–2D in which four macroinstructions contain operation codes designated 28a–28d with four, six, eight and 10 bits, respectively. To overcome the above mentioned difficulties encountered by prior known system with such varying length operation codes, the present invention, by address generation means 20, transforms or maps an arbitrary operation code into an arbitrary control store address. Furthermore, the particular implementation of address generation means 20 in accordance with the principles of the present invention does not limit the choice of operation codes which may be employed and does not limit the starting addresses which may be selected. More particularly, address generation means 20 may be implemented with a programmable logic array 30, such as that illustrated in its functional logic form in FIG. 3. It is to be understood that the diagram of FIG. 3 is only an equivalent logic diagram of the array 30.

The array 30 includes a plurality of input terminals 32a–32m, where m represents any number greater than 1. These input terminals are connected directly to lines 36a–36m, respectively, and through respective ones of inverters 34a–34m to lines 38a–38m, respectively. A plurality of AND gates 40a–40n, where n represents any number greater than 1, are disposed for selective connection at their inputs to one or more of the lines 36 and 38, but in no event will any one of the gates 40 be connected to two lines having the same letter suffix in its designation. Such selective connections are represented by an "X" in the drawing, which symbol corresponds to a mask option during the manufacture of the array 30. Outputs of the AND gates 40a–40n are connected to lines 42a–42n, respectively. A plurality of OR gates 44a–44p, where p represents any number greater than 1, have their respective inputs disposed for selective connection to respective ones of the lines 42, as represented by the mask option symbol X on the drawing.

Although any input code can be decoded to any output code in the array 30, it is not desirable to have all possible input combinations decoded within the same unit. The number of inputs which can be supplied to the array 30 exceeds that which would be available with a comparable read-only memory. In the example of the array 30 having 14 inputs and eight outputs, a comparable read-only memory would have 16,384 words. The array 30, however, would have considerably fewer (typically less than several hundred) equivalent words. These words or terms are called partial product terms and each such term can be described as a logical AND function which relates to a portion of the total output terminal solution at the outputs of the OR gates 44. Each partial product term is developed on a respective one of the lines 42. Each product term can be programmed to any complexity up to the input limit of the array 30. In the above example, the array 30 may have as many as 14 variables in its product term or it may only have one input which establishes the product term. The array 30 can logically be described as a collection of "ANDs" which may be "ORed" at any of its outputs.

The large variation in the partial product terms possibilities with m input variables and n partial product terms can be better appreciated from the following example equations:

$$P_1 = I_1 I_6 I_7 \overline{I_{10}} I_m$$

$$P_2 = I_4 I_5 I_7 I_{12} \overline{I_{13}} I_m$$

$$P_3 = I_8 I_{12}$$

$$P_4 = I_8 I_9 I_{10} I_{11}$$

$$P_n = I_1 I_2 I_3 I_{13} I_m;$$

where P represents a partial product term at the output of a respective one of the gates 40 on the lines 42 and 1 represents an input on a respective one of the input terminals 32.

It is possible to combine or collect by mask option any of the product terms for any of the several outputs to establish the code combinations desired. Logically any or all of the partial product terms (AND terms) can be combined (ORed) at each output. The equations for the output group at the outputs of the Or gates 44 have the following form:

$$O_1 = P_1 + P_{16} + P_{20} + P_{42} + \ldots P_u$$

$$O_2 = P_6 + P_{16} + P_{17} + P_{42} + \ldots P_{52}$$

$$O_p = P_1 + P_{20} + P_{30} + \ldots P_n;$$

where O represents an output from a respective one of the gates 44.

In the alternative the programmable logic array 30 may be considered conceptually as a read-only memory with programmable addresses as well as the usual programmable data portion. If an address input occurs that has not been programmed by mask option, no word of the array 30 will be accessed and the outputs will all be zeros. If an address input occurs which has been programmed for than one word, the contents of the several words will be logically ORed together to form the output. When programming addresses, each bit of the address can be programmed as a "1", a "0", or a "don't care". Bits programmed as don't cares will be ignored in the address decoding, and thus several different addresses may be made to access the same word of the array 30. By employing the array 30, only the addresses and words required for a particular function need be implemented, as opposed to all addresses and words which are implemented with read-only memory structures. These advantages of the array 30 are utilized to their fullest extent in the embodiments of the present invention illustrated in FIGS. 4–6.

With reference to FIG. 4, the address generation means 20 is implemented with the array 30 to provide address mapping. In this case the array 30 (address generation means 20) is employed to provide an arbitrary operation code-to-control store address transformation. The number of address inputs to the array 30 is equal to the largest number of operation code bits in the macroinstruction supplied from the instruction register 18. The number of outputs of the array 30 is equal to the number of address bits in the control store. If, for example, the control store 22 is a 256 word store, eight outputs will be needed from the array 30. The number of words or partial product terms in the array 30 is equal to the number of macroinstruction types and each macroinstruction type; that is, each unique operations code, will access a different word of the array 30 to address the appropriate microroutine in the control store 22. All bits at the output of the register 18 which are not part of the operation code are considered as don't care bits. Considering the instruction set of FIGS. 2A–2D, for example, the maximum operation code portion is 10 bits in length and, therefore, the array 30 will have 10 inputs. However, when the instruction of FIG. 2A is contained in the register 18, only the four bits of the operation code 28a will be significant and the remaining six bits will be considered as don't care bits.

An address generated by the array 30 is stored in an address register 46 for addressing the control store 22. The register 46 may be a counter register so that sequential instructions can be addressed by appropriate inputs thereto. Minimization techniques are known for reducing the number of partial product terms in the array 30 and, therefore, the number of gates required. The control store 22 may consist of any addressable memory device, such as a read-only memory.

FIG. 5 illustrates a second embodiment of the present invention in which the instruction register 18 is connected directly to the address portion of the control store 22 which is implemented with the array 30. Accordingly, the microprogram is stored in the array 30 (control store 22) and the instruction register 18 directly accesses the routine in the array 30, which, in turn, implements the macroinstruction, thereby saving execution time. Only the operation code bits are significant in accessing the array 30, with the other bits of the macroinstruction being programmed as don't cares. Since this uses up all possible instruction bit combinations, one or more extra address bits are provided on one or more terminals 48 from another source (not shown) for multiple microinstruction routines. Such address bits are employed to cause the system to cause the system to sequence and may be supplied from an output of the array 30 directly or through a counting register or may be supplied directly from a counter. Branch conditions which influence the execution of instructions may be employed to generate one or more address bits at one or more terminals 50 to address a different instruction in accordance with that condition.

Since the microprogram is stored in a programmable logic array, identical words can be made to occupy a single physical location by the use of don't care bits. This reduces the number of microprogram words when compared with read-only memory storage. Furthermore, subroutines can be replaced by inline code which is shared between program segments through the use of don't care bits. Additionally, fixed length program loops can be replaced with repetitive statements which execute at higher speed and occupy fewer physical locations. Accordingly, an eight-bit byte shift would require a minimum of three steps (shift, decrement counter, conditional branch) and 24 microinstruction executions when implemented with read-only memory, but requires only a single physical location (one shift instruction) and eight executions when implemented with a programmable logic array with three don't care terms. Finally, the array 30 may be used to eliminate the requirement for explicit microinstruction branch tests of interrupts or other conditions. This is accomplished by using these conditions as address inputs to the array 30 via the terminal 50. This organization allows high execution speed, but requires a very large array, since there are many array inputs and each input requires both true and compliment terms. However, this limitation may not present a major problem, since minimization techniques may be employed to reduce the number of words required for the microprogram.

A third embodiment of the present invention is illustrated in FIG. 6 in which the address generation means 20 and the control store 22 are both implemented with programmable logic arrays. A plurality of AND gates 52a–52p each have one input supplied from a respective output of the generation means 20 and a second input supplied from a respective output of the register 18. Outputs of the AND gates 52 are supplied as inputs to the address register 46, which may also be a counter register.

The embodiment illustrated in FIG. 6 generally has the lowest bit count of the three embodiments discussed herein. The register 18 accesses a different word for each macroinstruction format in the generation means 20, as opposed to each macroinstruction as required in the embodiment illustrated in FIG. 4. The generation means 20 sets all bits which are not part of the operation code to zero. This has the advantage that those bits do not have to be don't cares in the control store 22 and thus may be used to access the several microinstructions in each routine. Accordingly, the requirement for extra address bits as required in the embodiment illustrated in FIG. 5 is obviated, provided the register 46 can be incremented, or feedback address lines are multiplexed into the input of the address register 46. However, all of the other advantages are retained.

In the above described embodiments all of the well known control functions and their corresponding components are not described or shown. However, it is to be understood that these functions can be performed as with other processing systems. For example, multiplexers may be employed to supply address bits to the register 46 or to the control store 22. Furthermore, additional inputs would be required to cause the counter register 46 to sequence.

It is to be understood that the teachings of the present invention can be extended beyond the specific embodiments described herein. For example, the control store array 30 may be partitioned; that is; composed of several arrays 30 each having its own function, such as one for ALU control, one for register control, one for interrupt control, and another for input/output control. This technique requires fewer bits and reduced interconnects in certain applications.

Another technique, which may be employed in combination with parallel partitioning, is the implementation of several different levels of the control store 22 with a programmable logic array. Accordingly, a microinstruction may cause the execution of a sequence of lower level control instructions, either in a single nanoprogrammed logic array or in one or more of several parallel functionally partitioned programmable logic arrays.

The invention claimed is:

1. A data processing system comprising
    first means for storing a plurality of instructions which are of a first level and each including an operation code;
    first programmed means for storing a plurality of instructions which are of a second level;
    storage means for storing data information to be processed;
    operation means connected to said storage means and to said first programmed means for performing controlled operations on information supplied thereto from said storage means in accordance with instructions supplied from said first programmed means; and
    second programmed means connected to said first means and to said first programmed means for generating address information in accordance with the operation codes of instructions selected from said first means and supplying said address information to said first programmed means for selecting instructions to be supplied to said operation means,
one of said programmed means including a first plurality of input terminals, a first programmable addressing portion including first addressable means for generating a plurality of outputs which are each a product term and are each the equivalent of an AND function of selected inputs on said input terminals, and a programmable data portion including first data means for selectively combining said product terms to form a plurality of outputs corresponding to output data.

2. The data processing system of claim 1, wherein said first programmed means includes said plurality of input terminals for receiving address information thereon from said second programmed means, and further includes said addressable means and said data means, such that the address information from said second programmed means generates a corresponding one of the second level instructions at an output of said first programmed means.

3. The data processing system of claim 2, wherein said second programmed means includes a second plurality of input terminals disposed for receiving the operation codes of instructions selected from said first means, second addressable means for generating a plurality of outputs which are each a product term and are each the equivalent of an AND function of selected inputs on said second input terminals, and second data means for selectively combining said product terms to said second addressable means to form a plurality of outputs corresponding to output data, such that the operation codes of instructions selected from said first means are converted to said address information which is supplied to said first plurality of input terminals.

4. The data processing system of claim 1, wherein said second programmed means includes said plurality of input terminals for receiving the operation codes of instructions selected from said first means, and further includes said addressable means and said data means, such that the operation codes of instructions selected from said first means are converted to said address information.

5. The data processing system of claim 4, further comprising a plurality of AND gates each connected to a respective output of said second programmed means and to a respective output of said first means to develop address information at outputs thereof to be supplied to said first programmed means.

6. The data processing system of claim 5, wherein said first programmed means includes a second plurality of input terminals disposed for receiving address information thereon from said second programmed means, second addressable means for generating a plurality of outputs which are each a product term and are each the equivalent of an AND function of selected inputs on said second input terminals, and second data means for selectively combining said product terms of said second addressable means to form a plurality of outputs corresponding to output data, such that the address information from said second programmed means generates a corresponding one of the second level instructions at an output of said first programmed means.

7. A data processing system comprising
first means for storing a plurality of instructions which are of a first level and each including an operation code;
second means for storing a plurality of instructions which are of a second level and including a plurality of input terminals disposed for receiving the operation codes of instructions from said first means, addressable means for generating a plurality of outputs which are each a product term and are each the equivalent of an AND function of selected inputs on said input terminals, and data means for selectively combining said product terms to form a plurality of outputs corresponding to output data, such that the operation codes of instructions selected from said first means generate a corresponding one of the second level instructions at said outputs corresponding to output data;
storage means for storing data information to be processed; and
operation means connected to said storage means and to said data means for performing controlled operations on information supplied thereto from said storage means in accordance with instructions supplied thereto from said data means.

* * * * *